Nov. 16, 1937.   A. H. R. FEDDEN ET AL   2,098,947
COWL FOR AIR-COOLED AIRCRAFT ENGINES
Filed July 23, 1936   6 Sheets-Sheet 3
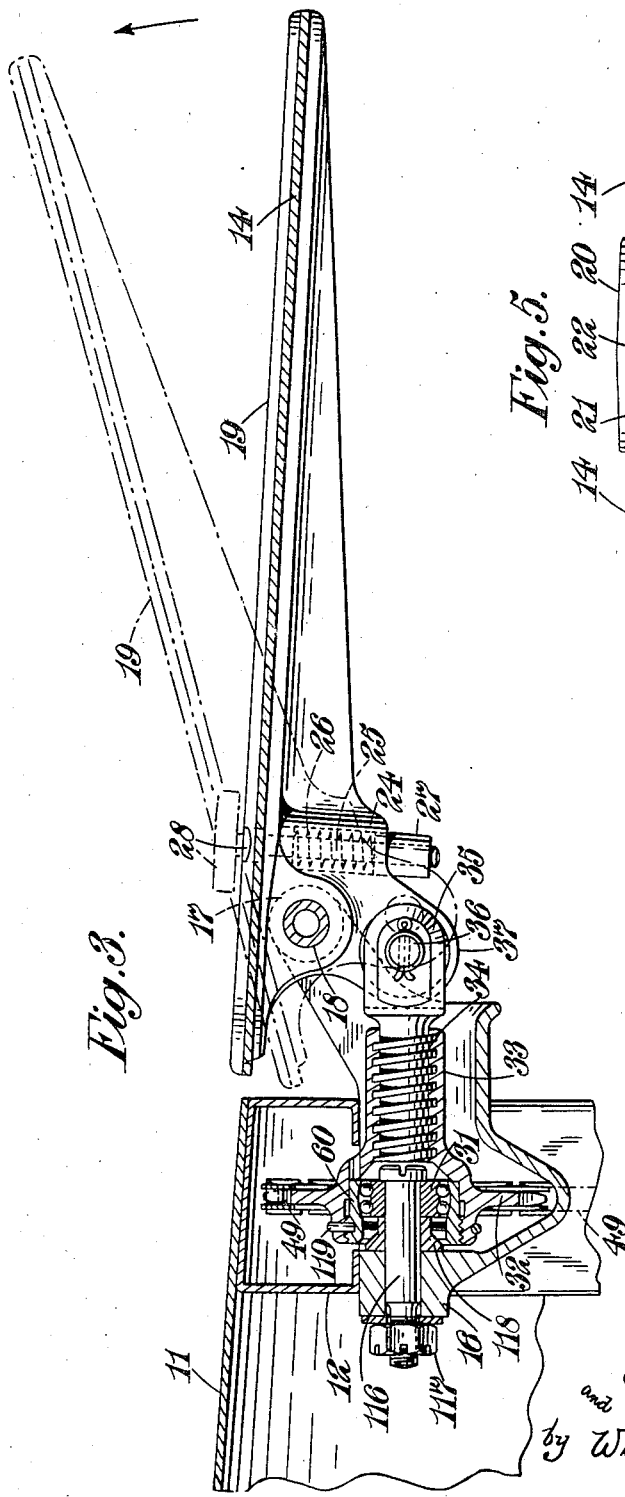
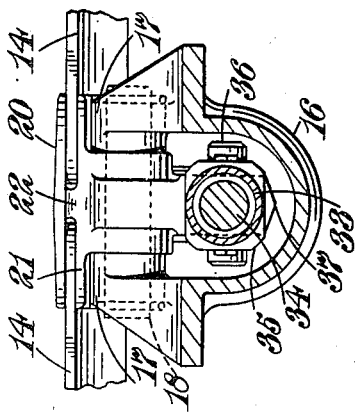
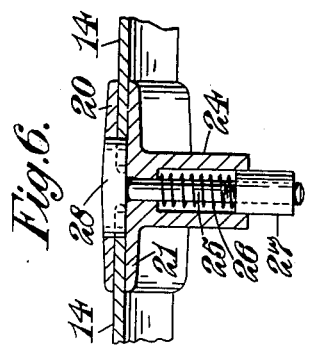
Inventors
Alfred H. R. Fedden
and John W. Copley
by Wilkinson & Mawhinney
Attorneys.

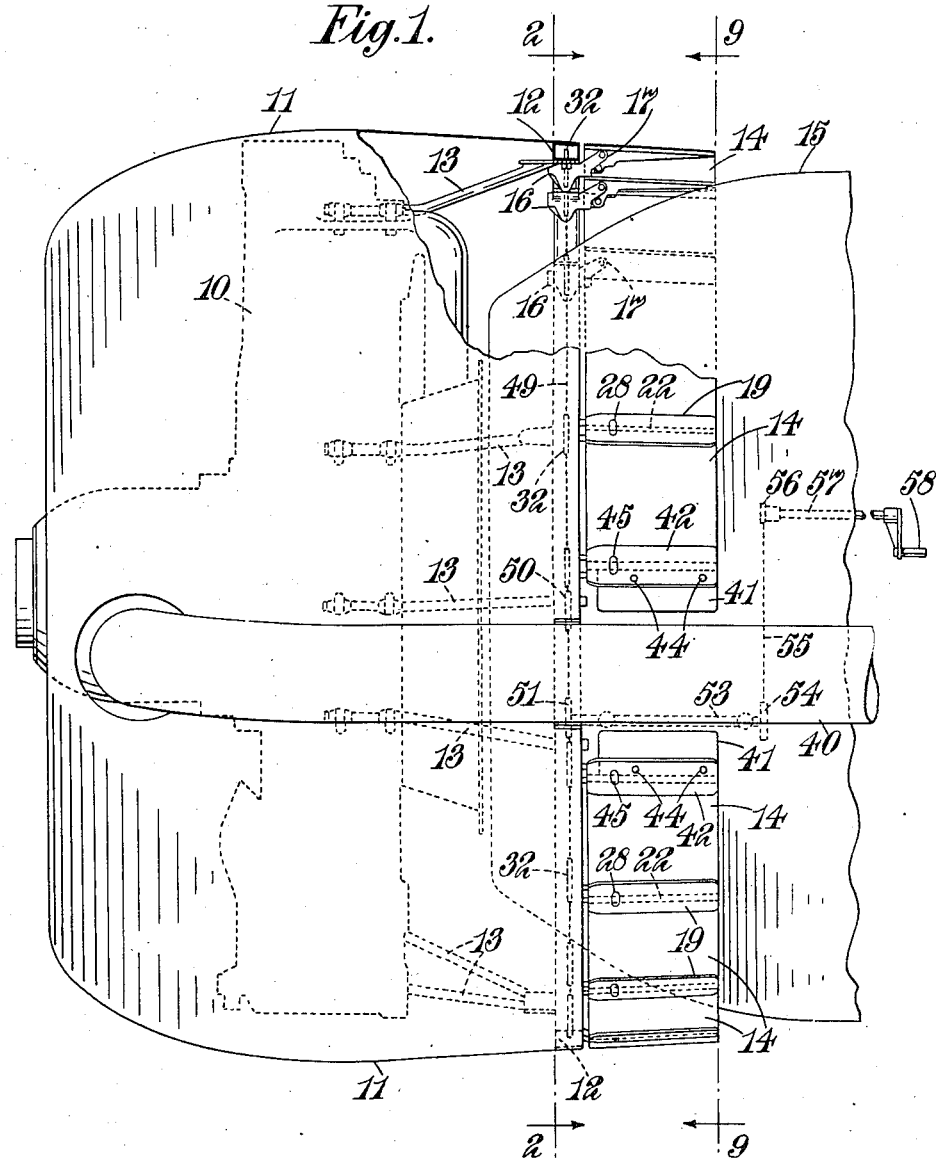

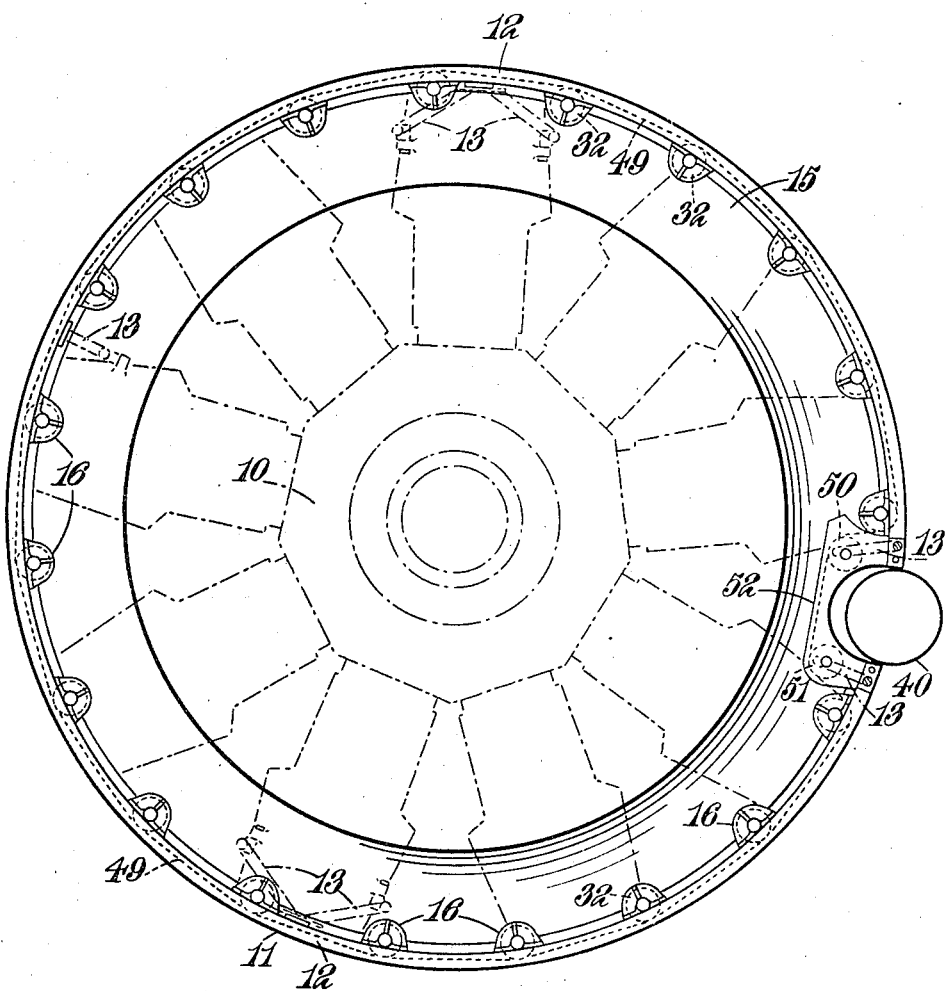

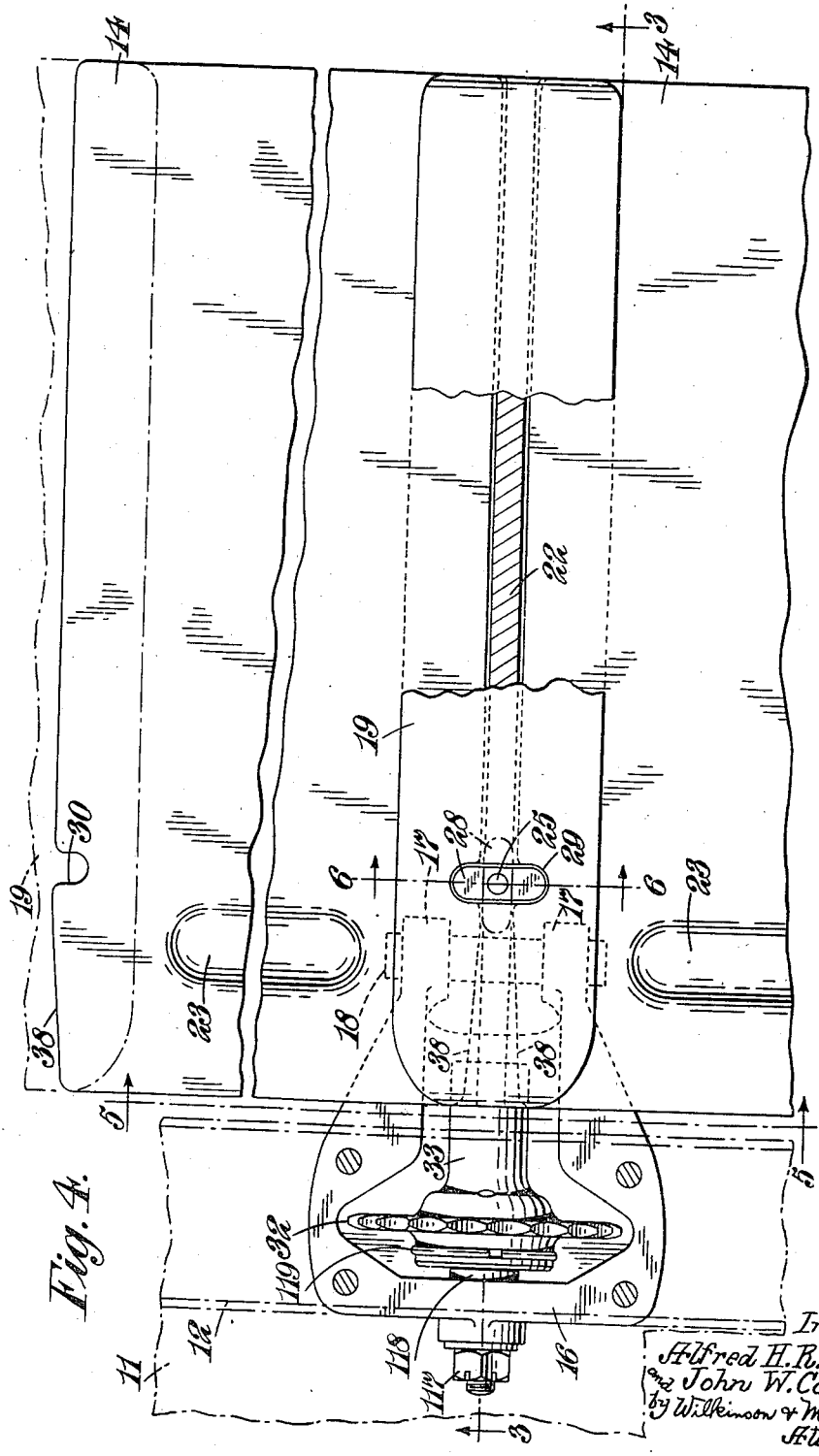

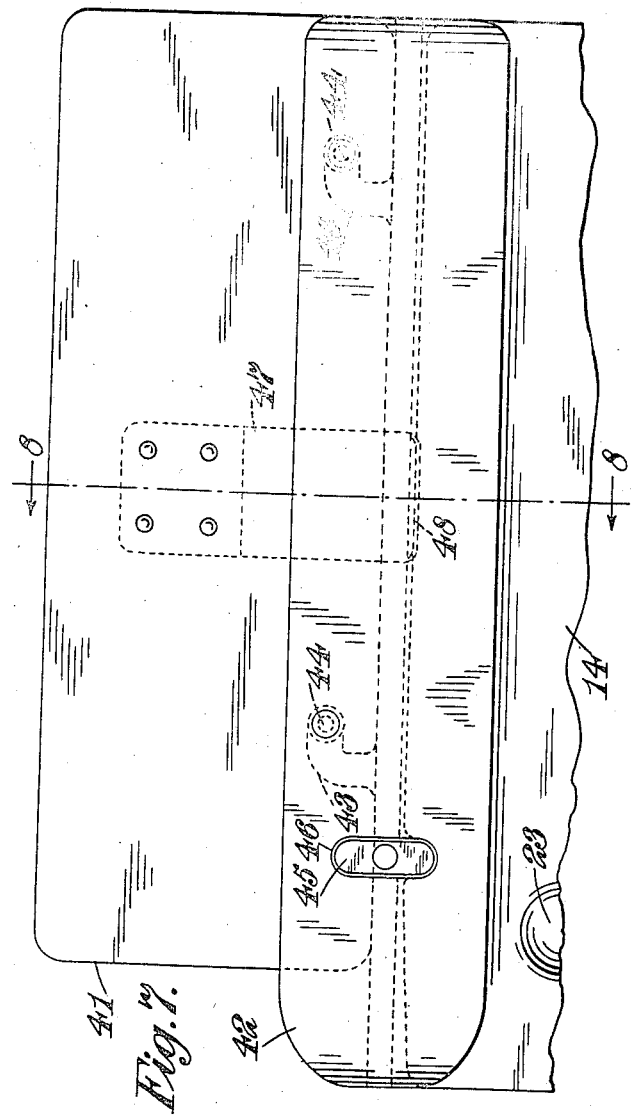

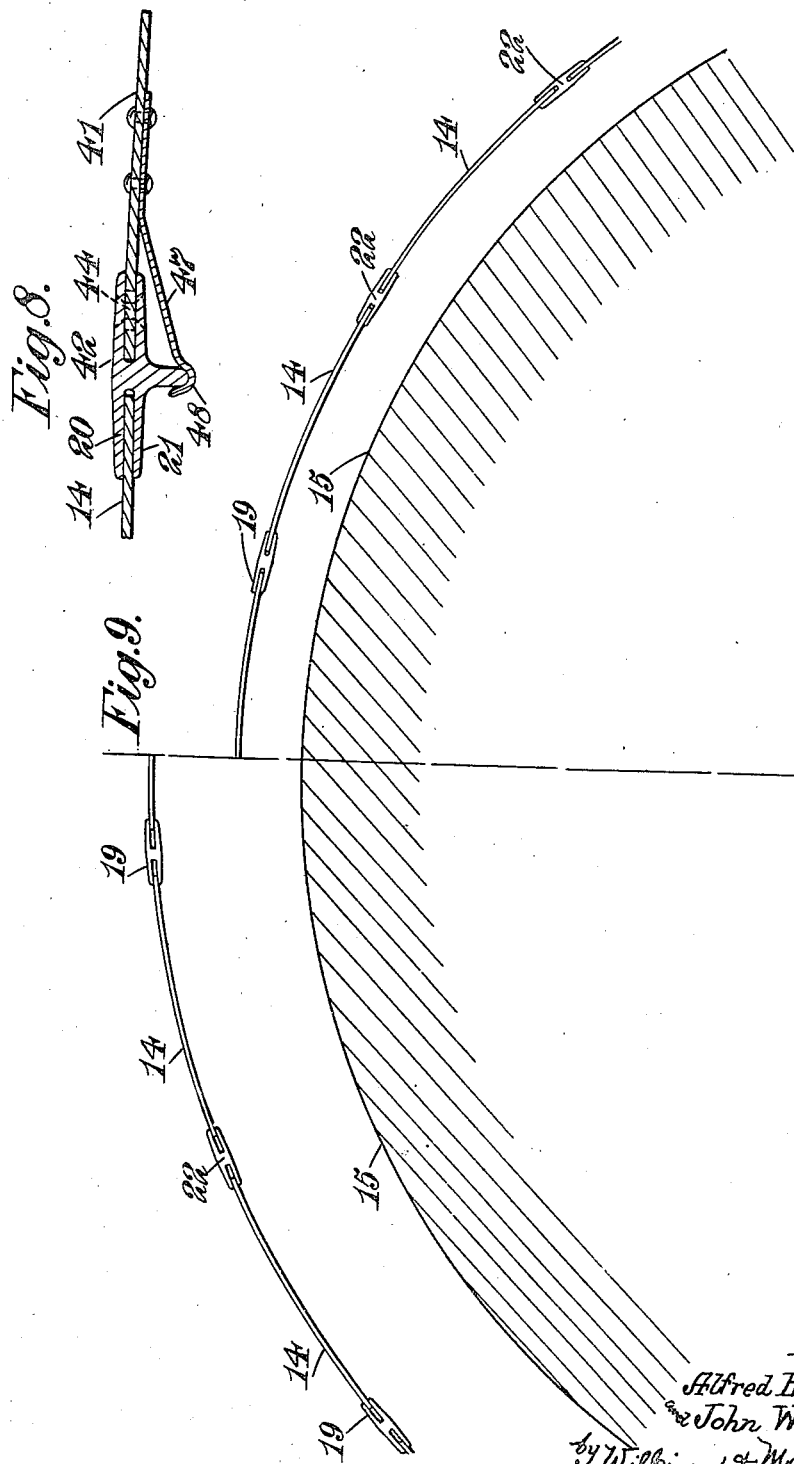

Patented Nov. 16, 1937

2,098,947

UNITED STATES PATENT OFFICE 2,098,947

COWL FOR AIR-COOLED AIRCRAFT ENGINES

Alfred Hubert Roy Fedden and John William Copley, Bristol, England, assignors to The Bristol Aeroplane Company Limited, Bristol, England, a British company Application July 23, 1936, Serial No. 92,188 In Great Britain August 9, 1935

4 Claims. (Cl. 123—171)

This invention is for improvements in cowls, for air-cooled aircraft engines, of the kind having a plurality of adjustable flaps at the trailing edge of the cowl whereby the rate of flow of air through the cowl may be controlled. Such flaps are hinged about axes which lie on the chords of a transverse cross-section of the cowl, and are arranged to be opened outwardly to increase the cross-sectional area of the annular orifice between them and the aircraft body or nacelle by which the engine is carried.

According to the present invention, the said flaps are arranged to overlap circumferentially with intervening members by such an extent as to continue to overlap them when the flaps are opened. The intervening members are preferably the actuating members and may be arms extending rearwardly and pivoted about an axis lying at right-angles to a fore-and-aft plane. Where the engine is a radial-cylinder engine, the cowl is circular in form so that the axes about which the said arms are hinged lie circumferentially around the cowl.

Each arm, in cross-section transverse to the axis of the cowl, preferably comprises two circumferentially-extending flanges interconnected by a radial web so as to afford two circumferential slots, one on each side of the arm. Each of said slots makes sliding engagement with the marginal portion of a plate-like flap which is curved circumferentially to conform to the general shape of the cowling so that the arms and flaps constitute a rearward extension of the fixed portion of the cowl.

The operating mechanism for the adjustable flaps comprises a series of pivoted members arranged around the cowl, a series of gears each connected to one of said pivoted members, and a single driving member such as a chain or linkage extending circumferentially of the cowl and engaging with all the gears to drive them. The gears are preferable rotatable about axes lying fore-and-aft of the cowl, each gear being appropriated to one of said pivoted members.

The operating mechanism is preferably non-reversible and, according to another feature of the invention, comprises a series of arms pivoted to the cowl at points arranged around it, a series of screw-threaded members rotatable about axes lying fore-and-aft of the cowl, a second screw-threaded member co-operating with each of said series of screw-threaded members and operatively connected to one of said arms to tilt it upon rotation of the said series.

A specific embodiment of the present invention will now be described by way of example, with reference to the accompanying drawings, in which:—

Figure 1 is a side view of a cowled radial-cylinder engine, incorporating the invention, Figure 2 is a sectional elevation looking on the line 2—2 of Figure 1.

Figure 3 is a sectional elevation, to an enlarged scale, showing one of the actuating arms, being a section on the line 3—3 of Figure 4.

Figure 4 is a plan corresponding to Figure 3,

Figure 5 is a sectional elevation on the line 5—5 of Figure 4,

Figure 6 is a section on the line 6—6 of Figure 4,

Figures 7 and 8 show a detail of construction, Figure 8 being a section on the line 8—8 of Figure 7, and Figure 9 is a diagrammatic view looking on the line 9—9 of Figure 1.

As shown first in Figures 1 and 2, an air-cooled radial-cylinder engine 10 is surrounded by a fixed cowl 11 of usual form having at its rear edge a stout metal ring 12 of rectangular cross-section. The ring 12 is supported by suitably arranged brackets 13 from the cylinders or other part of the engine 10. The ring 12 carries bearing pivots for a series of flaps 14 which form a rearward extension of the fixed portion 11 of the cowl and are so arranged in relation to the body or nacelle 15 of the aircraft as to leave an annular orifice at their rear edges through which the cooling air for the engine escapes on leaving the cowl. As will be explained below, the size of this orifice is adjustable whereby the rate of flow of air through the cowl is controlled for the purpose of maintaining the correct engine temperature.

As shown in Figures 3, 4 and 5, the ring 12 supports a series of bearing brackets 16 around it. Each of the brackets 16 has two rearwardly-projecting lugs 17 which form a fork for supporting an axle 18. Pivotally borne on the axle 18 is a rearwardly-extending arm 19 which, as shown in Figures 5 and 6, comprises two flanges 20, 21 interconnected by a web 22. The flanges thus form a circumferential slot on either side of the web and each such slot is slidably engaged by the marginal portion of one of the flaps 14. Each flap is formed near its forward end with an inwardly-swaged portion 23 to give it additional stiffness.

At a point slightly in rear of the axle 18 each arm 19 is formed with an enlarged boss 24 (see especially Figure 6) which houses a bolt 25 pressed downwardly by a spring 26 engaging a nut-portion 27. The head 28 of the bolt is oblong in shape and, when in its operative position, engages a hole 29 (Figure 4) of the same shape formed in the top flange 20 and the web 22 of the arm 19. The sides of the bolt head 28 thus project into the slots in the arm 19 and each side of the bolt head engages with a recess 30 formed in the edge of the adjacent flap 14 (see the top of Figure 4).

When it is required to remove or replace the flaps 14 the bolts 25 are raised against the pressure of the springs 26 and rotated into the position shown in dotted lines as shown in Figures 3 and 4. In this position the bolt head is clear of the recesses 30 in the edges of the flaps 14 which may be withdrawn by sliding them rearwardly out of the slots in the arms 19 and may be replaced in a similar manner. When the bolt heads are restored to the position shown in Figure 6 they lock the plates against being withdrawn.

Each bracket 16 (see Figures 3 and 4) also carries a spindle 116 held in position by means of a nut 117. The spindle 116 takes the form of a bolt, the head of which engages a spherical ball-race 31 separated from the forward end of the bracket by a distance-piece 118 of suitable shape. The ball-race 31 co-operates with an outer race 60 of spherical form which is screw-threaded into the hub of a chain sprocket 32. The outer race 60 and the sprocket are locked against relative rotation by means of a circular clip 119.

The chain sprocket is formed integrally with an axial extension 33 which is cut internally with screw-threads or helical splines to engage with an externally screw-threaded spindle 34. The spindle 34 is formed with a fork 35 at its rear end which fork engages a pin 36 passing through a hole in an inwardly projecting lug 37 carried by the arm 19.

It will be seen that when the sprocket 32 is rotated, the spindle 34 is driven inwardly or outwardly with respect to the tubular extension 33, whereby the arm 19 is rotated about the axle 18. Figure 1 and the full lines of Figure 3 show the arms 19 in their "closed" position, that is to say, the position in which the orifice between the flaps and the body or nacelle 15 is a minimum. If each sprocket 32 is now rotated in a counter-clockwise direction as seen in Figure 2, all the spindles 34 will move rearwardly, whereby the arms 19 will open into the position shown in chain lines in Figure 3.

Figure 9 shows, on the right-hand side, the relative disposition of the flaps 14 and the arms 19 when the flaps are in their "closed" position, and on the left-hand side the relative disposition when the arms are moved out to the position shown in chain lines in Figure 3. It will be seen that, whereas the flaps almost abut against the webs 22 of the arms in the "closed" position of the flaps, they slide out in the slots in the arms as the arms are rotated so as to leave gaps between the edges of the flaps and the webs 22. However, even when the flaps are in their outermost position their edges are still engaged by the slots in the arms so that the arms and the flaps between them preserve an unbroken trailing edge to the cowl.

It will be seen that the adjacent edges of two adjacent flaps will move away from one another at all points in rear of the axle 18, as shown on the left-hand side of Figure 9, but will move towards each other at the region in front of the axle 18, as the arms move outwardly towards the position shown in dotted lines in Figure 3. Such movement of the edges towards each other is made possible by tapering them as shown at 38 (Figure 4) for the portion lying in front of the recess 30.

In some cases it is necessary to interrupt the cowl and the flaps at some point on the periphery. For example, as shown in Figures 1 and 2, an exhaust pipe 40 leading from an exhaust gas-collector (not shown) at the front of the cowl, lies half inside and half outside the wall of the cowl. The flaps 41 adjacent the exhaust pipe are therefore suitably shaped to avoid it and since they are supported along one edge only they have to be connected to their arms 42 in a special manner described with reference to Figures 7 and 8. Each of the short flaps 41 is formed with two L-shaped slots 43 each of which engages a rivet 44 passing through the slot between the flanges 20 and 21 on that side of the arm 42. When the flap 41 has been placed in the position shown in Figure 7, a bolt 45 is let into position with respect to a recess 46 in the edge of the flap so as to lock it in a manner similar to the operation of the bolts 25 described with reference to Figures 3, 4 and 6. Additional location for each of the flaps 41 is provided by a spring clip 47 riveted to the flap and having a hook-shaped end 48 engaging the inner edge of the rib on the arm 42.

All the sprockets 32 are driven by a single endless chain 49 passing right around the cowl and accommodated within the ring 12, and the pitch of the screw-threads between the spindle 34 and the tubular portions 33 is such that the mechanism is non-reversible; that is to say, a rotational force applied to the sprocket will move the spindle in and out as above described but no force, however great, applied to the arm 19, will rotate the sprockets. Thus, the heavy aerodynamic force to which the arms 19 and the flaps 14 are subjected when the aircraft is in flight are not transmitted to the chain 49 or other operating gear. In order to avoid the exhaust pipe 40, the chain is guided round idler sprockets 50, 51 (Figure 2) mounted in a suitable bracket 52 attached to the ring 12. Means may be provided within the bracket 52 for adjusting the tension in the chain if necessary.

From Figure 3 it will be seen that the axis of the pin 36 moves in the arc of a circle about the axis of the axle 18 by reason of its being carried by the lug 37. The spindle 34 must tilt during this movement and such tilting is made possible by the provision of a spherical bearing surface 60 within the sprocket 32.

The chain 49 may be driven manually or by any convenient form of power. Figure 1 shows a manual drive in which a shaft 53 extends rearwardly from the sprocket 51 and carries a second sprocket 54 at its rear end. The sprocket 54 is connected by a chain 55 to a sprocket 56 on a shaft 57 at the rear end of which is a hand-crank 58. The crank 58 may be disposed, for example, within the pilot's cockpit.

In one form of power drive for the chain, the shaft 53 may be driven by an electric motor through reduction gearing of large ratio, and in yet another arrangement, hydraulic power may be used.

Where the chain is driven from a source of power, the power may, if desired, be controlled by thermostatic means associated with the engine cylinders so that the flow of air through the cowl is automatically regulated so as to keep the temperature of the engine substantially at a predetermined constant value.

We claim:

1. A cowl for an air-cooled aircraft engine comprising a series of rearwardly-extending plate-like flaps entirely separate from the cowl, a pair of rearwardly-extending arms associated with each flap one at each margin thereof, a pair of longitudinal flanges on the side of each arm adjacent the flap so as to form a groove between them of which grooves at least one is of greater width than the thickness of the margin of the flap which can thus slide in at least one of said grooves, said margins being supported within said grooves, the circumferential distance between the flanges on one arm and the flanges on the other arm being substantially less than the corresponding dimension of the flap at all operating positions of the arms and the circumferential distance between the base of the groove on one arm and the base of the groove on the other arm being greater than the corresponding dimension of the flap, whereby the flap is supported solely by the arms at all operating positions thereof despite its being entirely separate from the cowl, a pivot for each arm lying along an axis at right-angles to a fore-and-aft central plane, and driving mechanism carried by a fixed part of the cowl and operatively connected to each said arm to rotate it about said pivotal axis.

2. A cowl for an air-cooled aircraft engine comprising a series of rearwardly-extending plate-like flaps entirely separate from the cowl, a pair of rearwardly-extending arms associated with each flap one at each margin thereof, a pair of longitudinal flanges on the side of each arm adjacent the flap so as to form a groove between them of which grooves at least one is of greater width than the thickness of the margin of the flap which can thus slide in at least one of said grooves, said margins being supported within said grooves, the circumferential distance between the flanges on one arm and the flanges on the other arm being substantially less than the corresponding dimension of the flap at all operating positions of the arms and the circumferential distance between the base of the groove on one arm and the base of the groove on the other arm being greater than the corresponding dimension of the flap, whereby the flap is supported solely by the arms at all operating positions thereof despite its being entirely separate from the cowl, a removable projection in said groove engaging a depression in the edge of said flap to locate the flap against withdrawal from the groove, a pivot for each arm lying along an axis at right-angles to a fore-and-aft central plane, and driving mechanism carried by a fixed part of the cowl and operatively connected to each said arm to rotate it about said pivotal axis.

3. A cowl for an air-cooled aircraft engine comprising a series of rearwardly-extending plate-like flaps entirely separate from the cowl, a pair of rearwardly-extending arms associated with each flap one at each margin thereof, a pair of longitudinal flanges on the side of each arm adjacent the flap so as to form a groove between them of which grooves at least one is of greater width than the thickness of the margin of the flap which can thus slide in at least one of said grooves, said margins being supported within said grooves, the circumferential distance between the flanges on one arm and the flanges on the other arm being substantially less than the corresponding dimension of the flap at all operating positions of the arms and the circumferential distance between the base of the groove on one arm and the base of the groove on the other arm being greater than the corresponding dimension of the flap, whereby the flap is supported solely by the arms at all operating positions thereof despite its being entirely separate from the cowl, a pivot for each arm lying along an axis at right-angles to a fore-and-aft central plane, a series of chain sprockets rotatable about fore-and-aft axes, a series of self-aligning bearings each carrying one of said sprockets, a rearwardly-extending internally screw-threaded tubular extension from each of said sprockets, an externally screw-threaded spindle pivoted to each of said arms and engaging with one of said tubular extensions, a chain extending around the cowl and engaging with all of said chain sprockets simultaneously, and means for driving said chain whereby said arms and consequently said flaps may be tilted outwardly or inwardly with respect to the fore-and-aft axis of the cowl.

4. A cowl for an air-cooled aircraft engine having a series of pivoted actuating arms projecting rearwardly from the cowl, a series of plate-like flaps arranged alternately with said arms and entirely separate from the cowl, lateral projections from each of said arms to engage with the marginal portion of an adjacent flap, said marginal portions being supported by said lateral projections, the circumferential distance between the lateral projections from one arm and the adjacent lateral projections from the adjacent arm being less than the corresponding dimension of the flap lying between those arms at all operating positions of said arms, whereby the said flap is supported solely by the said arms at all operating positions thereof, and means for simultaneously tilting all of said arms about axes lying at right-angles to fore-and-aft central planes.

ALFRED HUBERT ROY FEDDEN.
JOHN WILLIAM COPLEY.